United States Patent [19]
Nakada et al.

[11] Patent Number: 5,069,975
[45] Date of Patent: Dec. 3, 1991

[54] ELECTROLUMINESCENT ELEMENT

[75] Inventors: Hitoshi Nakada; Takeo Wakimoto; Masanao Shinkai, all of Saitama; Daisaku Matsunaga, Tokyo, all of Japan

[73] Assignees: Pioneer Electronic Corporation; Nippon Kayaku Kabushiki Kaisha, both of Tokyo, Japan

[21] Appl. No.: 483,379

[22] Filed: Feb. 22, 1990

[30] Foreign Application Priority Data

Feb. 23, 1989 [JP] Japan .................................... 1-44941

[51] Int. Cl.$^5$ ................................................ H01J 1/62
[52] U.S. Cl. .................................... 428/457; 428/690; 428/917; 313/504; 313/507
[58] Field of Search ............... 428/690, 917, 457, 461; 313/504, 507, 428

[56]         References Cited
U.S. PATENT DOCUMENTS 4,720,432  1/1988  VanSlyke et al. ................... 428/917
4,769,292  9/1988  Tang et al. .......................... 428/917
4,885,211  12/1989 Tang et al. .......................... 428/917

*Primary Examiner*—James Seidleck
*Attorney, Agent, or Firm*—Fleit, Jacobson, Cohn, Price, Holman & Stern

[57]              ABSTRACT

Disclosed herein is an electroluminescent element which is constructed such that a fluorescent substance layer and a hole transport layer, both made of organic compounds and laminated on top of the other, are interposed between a cathode and an anode. The fluorescent substance layer is a thin film containing a bisstyryl derivative. It emits blue light efficiently at a high luminance upon application of a low voltage.

10 Claims, 1 Drawing Sheet

ELECTROLUMINESCENT ELEMENT

BACKGROUND OF THE INVENTION

1. Field of the Invention

The present invention relates to an electroluminescent element. More particularly, it is concerned with an electroluminescent element in which the luminescent material is an organic compound.

2. Description of the Prior Art

Prior art electroluminescent elements have two or three layers of organic compounds. For example, the one shown in FIG. 1 has an organic fluorescent substance thin film 3 and an organic hole transport layer 4 laminated on top of the other, which are sandwiched between a metal electrode 1 as a cathode and a transparent electrode 2 as an anode. The one shown in FIG. 2 has an organic electron transport layer 5, an organic fluorescent substance thin film 3, and an organic hole transport layer 4 laminated on top of the other, which are sandwiched between a metal electrode I and a transparent electrode 2. The organic hole transport layer 4 facilitates the injection of holes from the anode and blocks electrons, and the organic electron transport layer 5 facilitates the injection of electrons from the cathode. The transparent electrode 2 is provided with a glass substrate 6. The metal electrode 1 injects electrons and the transparent electrode 2 injects holes, and the recombination of the electrons and holes generates excitons, which emit light as they are deactivated through radiation. This light radiates outward through the electrode 2 and the glass substrate 6.

The conventional electroluminescent element having the organic fluorescent substance thin film 3 constructed as indicated above has a disadvantage in that it emits light of limited spectra, for example, green light having a wavelength of about 530 nm, and it does not emit blue light of high purity at a high luminance.

SUMMARY OF THE INVENTION

The present invention was designed to eliminate the above-mentioned disadvantages found in the conventional electroluminescent element. Accordingly, it is an object of the present invention to provide an electroluminescent element which permits the fluorescent substance to efficiently emit light at a high luminance.

The gist of the present invention resides in an electroluminescent element having interposed beneath a cathode and above an anode a fluorescent substance layer of organic compound atop a hole transport layer of organic compound wherein the fluorescent substance layer comprises a fluorescent substance thin film containing a bisstyryl derivative capable of efficiently emitting light at a high luminance upon application of a low voltage and represented by the structural formula (XIII) below.

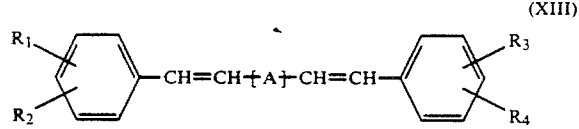
(XIII)

where A denotes

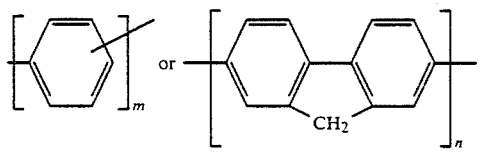

m denotes a numeral of 1, 2, 3, or 4; n denotes a numeral of 1 or 2; and $R_1$, $R_2$, $R_3$, and $R_4$ independently denote a functional group selected from the group consisting of —H (hydrogen atom), $C_2H_{2Z+1}$ (alkyl group, with Z being an integer), $OC_YH_{2Y+1}$ (alkoxy group, with Y being an integer), —X (halogen group), —NH$_2$ (amino group), and NRR' (dialkylamino group, with R and R' being alkyl groups).

DETAILED DESCRIPTION OF PREFERRED EMBODIMENT

Figure 3:
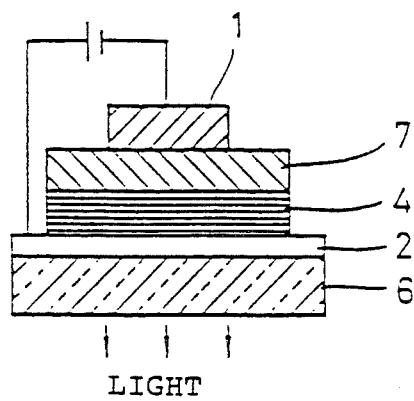
FIG. 3 is a schematic representation showing the structure of an embodiment of the present invention.
Figure 1:
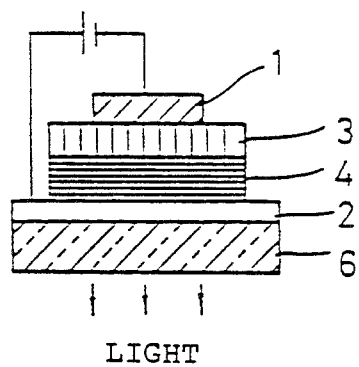
FIGS. 1 and 2 are schematic representations showing the structure of the conventional electroluminescent element.
Figure 2:
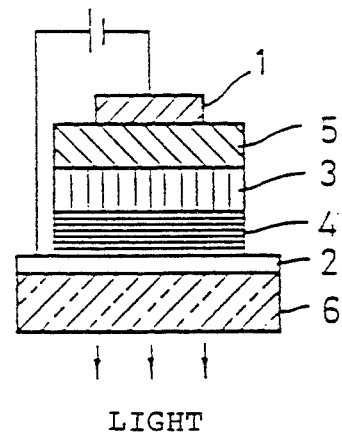

The invention will be described in more detail with reference to an embodiment shown in FIG. 3, in which like reference characters used in FIGS. 1 and 2 designate like or corresponding parts.

The metal electrode I as a cathode is an aluminum thin film 1500 Å thick. The aluminum thin film may be replaced by a thin film (thicker than 500 Å) of a metal with a small work function, such as magnesium, indium, silver, and alloys thereof.

The transparent electrode 2 as an anode is a thin film (2000 Å thick) of indium tin oxide (ITO). The ITO thin film (1000 Å–3000 Å thick) may be replaced by a thin film (800–1500 Å thick) of a metal with a great work function, such as gold. The electrode of gold thin film is semitransparent semitrasnparent.

Between the metal electrode I and the transparent electrode 2 are interposed the organic fluorescent substance thin film 7 and the organic hole transport layer 4 which are laminated on top of the other.

The organic hole transport layer 4 is a thin film (800 Å thick) of a triphenylamine derivative represented by the formula (I) below.

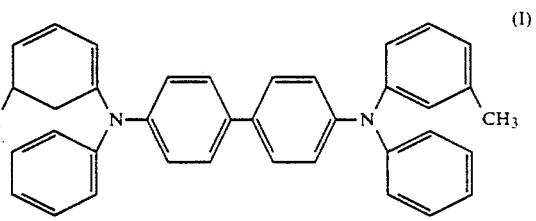
(I)

The organic hole transport layer 4 may also be made of a CTM (carrier transmitting material) represented by the following formulas (II) to (XII).

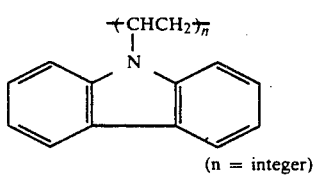
(n = integer)

(II)

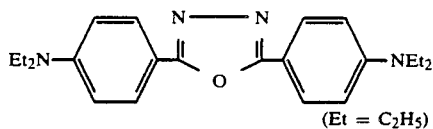
(Et = C₂H₅)

(III)

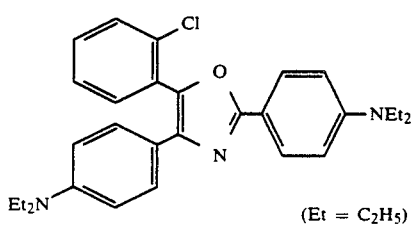
(Et = C₂H₅)

(IV)

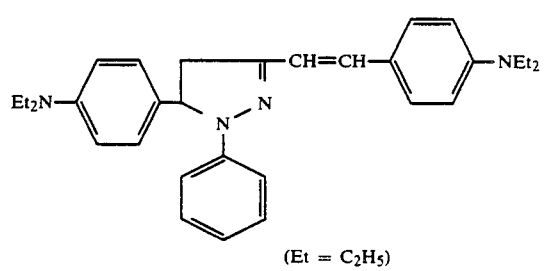
(Et = C₂H₅)

(V)

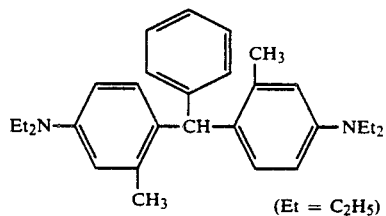
(Et = C₂H₅)

(VI)

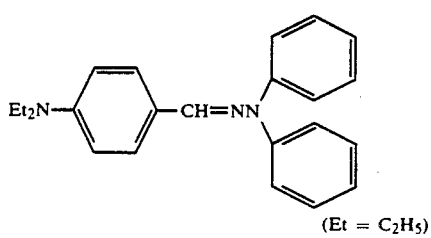
(Et = C₂H₅)

(VII)

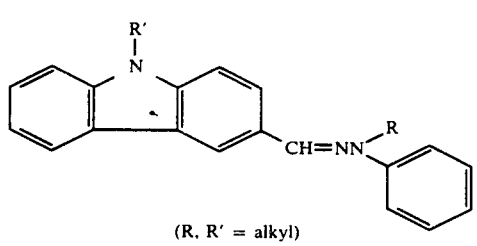
(R, R′ = alkyl)

(VIII)

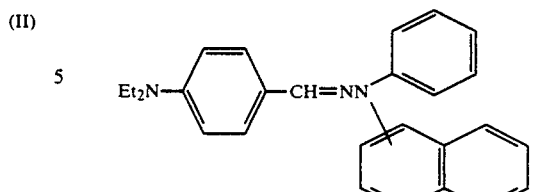
(Et = C₂H₅)

(IX)

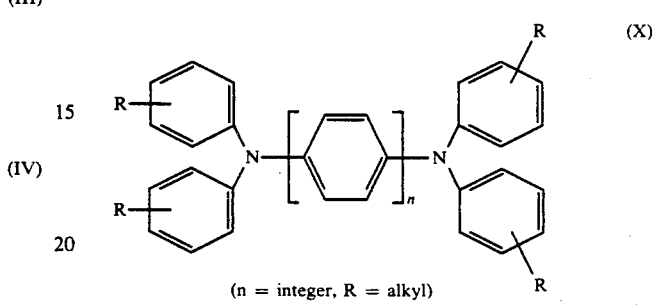
(n = integer, R = alkyl)

(X)

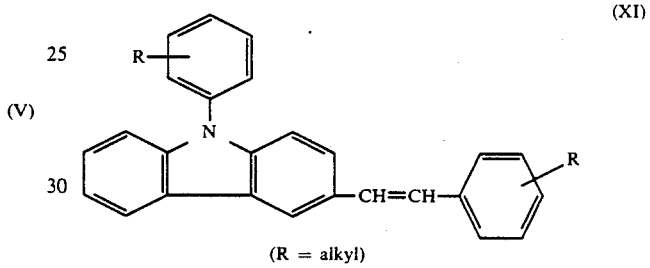
(R = alkyl)

(XI)

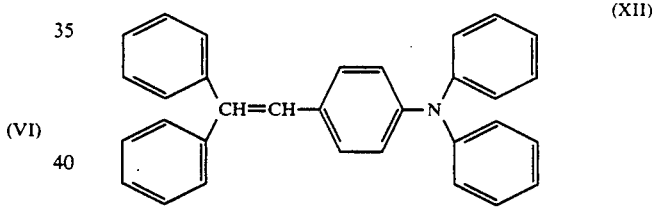

(XII)

The organic fluorescent substance thin film 7 is a thin film (800 Å thick) containing a bisstyryl derivative capable of efficiently emitting light at a high luminance upon application of a low voltage and represented by the structural formula (XIII) below.

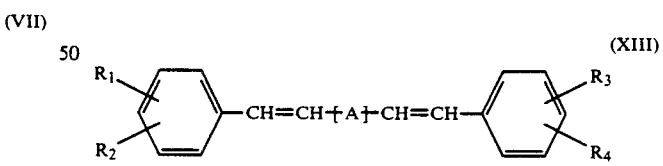

(XIII)

where A denotes

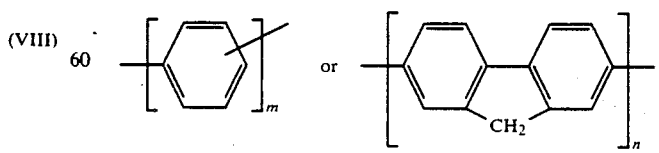

m denotes a numeral of 1, 2, 3, or 4; n denotes a numeral of 1 or 2; and $R_1$, $R_2$, $R_3$, and $R_4$ independently denote a functional group selected from the group consisting of —H (hydrogen atom), $C_ZH_{2Z+1}$ (alkyl group, with Z being an integer), OC$_Y$H$_{2Y+1}$ (alkoxy group, with Y being an integer), —X (halogen group), —NH$_2$ (amino group), and NRR' (dialkylamino group, with R and R' being alkyl groups).

An example of the bisstyryl derivative is a compound represented by the following formula (XIV) below.

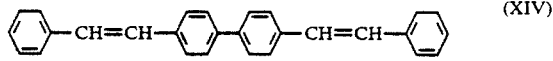

The organic fluorescent substance thin film 7 should preferably be thinner than 1 μm.

In this embodiment, the organic hole transport layer 4 of triphenylamine was deposited at a rate of 3 Å/sec, the organic fluorescent substance thin film 7 of bisstyryl derivative was deposited at a rate of 3.5 Å/sec, and the metal electrode I was deposited at a rate of 10.5 Å/sec.

The electroluminescent element of the present invention is made up of thin layers which are formed by vacuum deposition at $2\times10^{-5}$ Torr or below at a rate of 0.1–20.0 Å/sec.

The electroluminescent element produced as mentioned above emits light of a wavelength 440 nm at a maximum luminance of 163 cd/m$^2$ upon the application of a voltage of 25 V.

The bisstyryl derivative in the organic fluorescent substance thin film 7 may be replaced by a compound represented by the structural formula (XV) below.

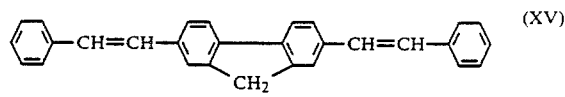

The resulting electroluminescent element with this compound emits light of a wavelength 445 nm at a maximum luminance of 180 cd/m$^2$ upon the application of a voltage of 28 V.

In other embodiments, which were produced in the same manner as mentioned above, the organic fluorescent substance thin film 7 contains any one of bisstyryl derivatives (or mixtures thereof) represented by the formulas (XVI) to (XXIII) below.

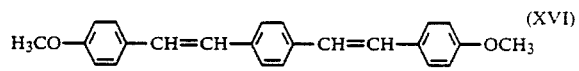

(This compound permits the emission of light of a wavelength 435 nm.)

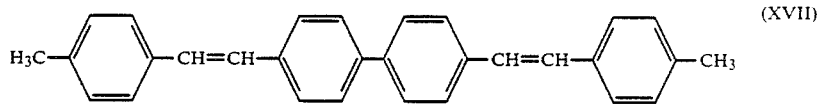

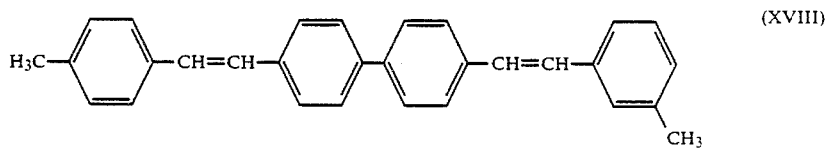

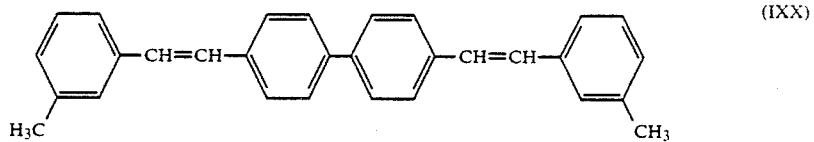

(These compounds permit the emission of light of a wavelength 440 nm.)

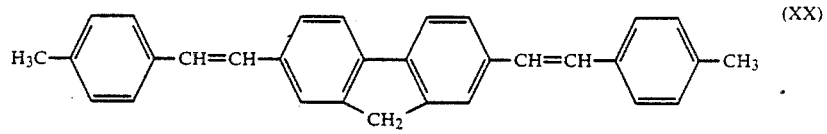

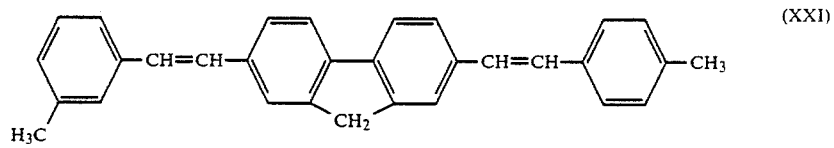

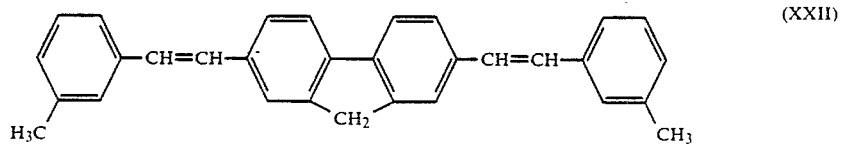

(These compounds permit the emission of light of a wavelength 445 nm.)

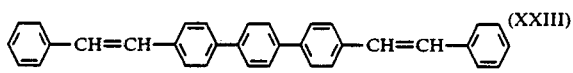 (XXIII)

(This compound permits the emission of light of a wavelength 450 nm.)

The electroluminescent elements in the above-mentioned embodiments are of two-layer structure (in which the organic fluorescent substance thin film 7 and the organic hole transport layer 4 are interposed between the electrode 1 and the anode 2). However, the two-layer structure may be replaced by the three-layer structure as shown in FIG. 2 to produce the same effect. In the latter case, an additional organic electron transport layer 5 is interposed between the cathode 1 and the fluorescent substance thin film 7 as shown in FIG. 2. The layer 5 may be made of a perylene tetracarboxy 1 derivative represented by the formula (XXIV) below.

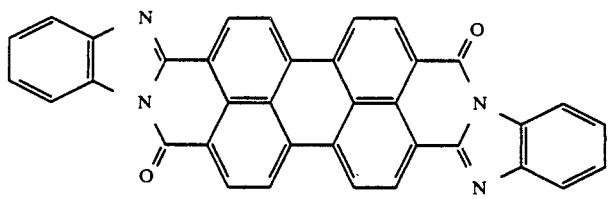 (XXIV)

As mentioned above, the electroluminescent element of the present invention is constructed such that a fluorescent substance layer and a hole transport layer, both made of organic compounds and laminated on top of the other, are interposed between a cathode and an anode.

The fluorescent substance layer is a thin film containing a bisstyryl derivative. It emits blue light efficiently at a high luminance upon application of a low voltage.

What is claimed is:

1. An electroluminescent element comprising a cathode, a fluorescent substance layer of organic compound, a hole transport layer of organic compound and an anode which are laminated in sequence, wherein the fluorescent substance layer is made of a bisstyryl derivative capable of efficiently emitting light at a high luminance upon application of a low voltage and represented by the structural formula below,

where A denotes

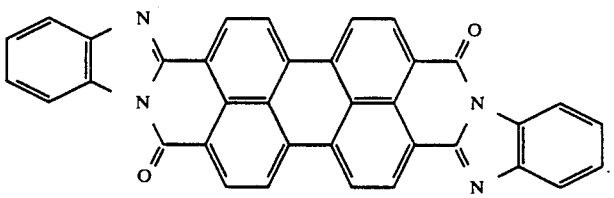

m denotes a numeral of 1, 2, 3, or 4; n denotes a numeral of 1 or 2; and $R_1$, $R_2$, $R_3$, and $R_4$, independently denote a functional group selected from the group consisting of —H (hydrogen atom), $C_ZH_{2Z+1}$ (alkyl group, with Z being an integer), $OC_YH_{2Y+1}$ (alkoxyl group, with Y being an integer), —X (halogen group), —NH$_2$ (amino group), and NRR' (dialkylamino group, with R and R' being alkyl groups).

2. An electroluminescent element as claimed in claim 1 which further comprises an organic electron transport layer interposed between said cathode and said fluorescent substance layer.

3. An electroluminescent element as claimed in claim 2, wherein said organic electron transport layer is made of a perylene tetracarboxyl derivative represented by the structural formula below, 4. An electroluminescent element as claimed in claim 1, wherein the bisstyryl derivative is a compound represented by the structural formula (XIV) below,

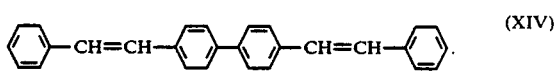 (XIV)

5. An electroluminescent element as claimed in claim 1, wherein the bisstyryl derivative is a compound represented by the structural formula (XV) below,

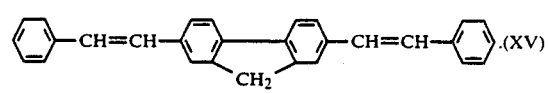 (XV)

6. An electroluminescent element as claimed in claim 1, wherein the bisstyryl derivative is a compound represented by the structural formula (XVI) below,

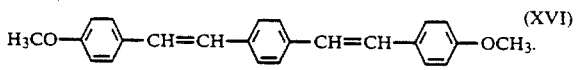

7. An electroluminescent element as claimed in claim 1, wherein the bisstyryl derivative is a mixture of compounds represented by the structural formulas (XVII), (XVIII), and (IXX) below,

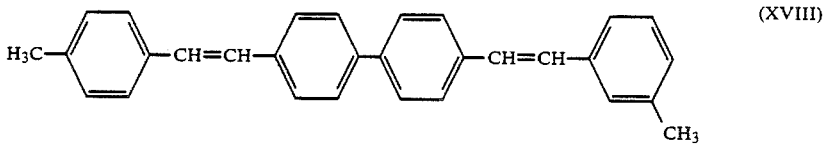

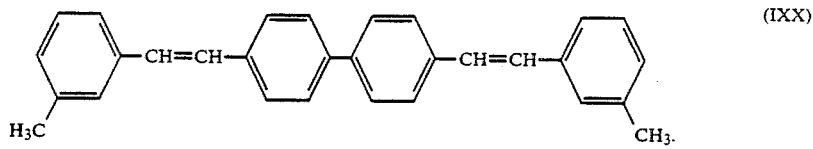

8. An electroluminescent element as claimed in claim 1, wherein the bisstyryl derivative is a mixture of compounds represented by the structural formulas (XX), (XXI), and (XXII) below,

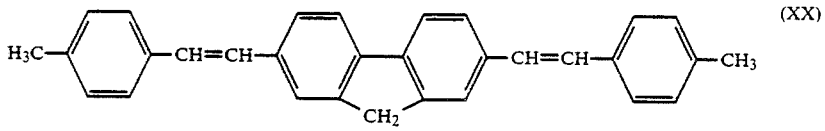

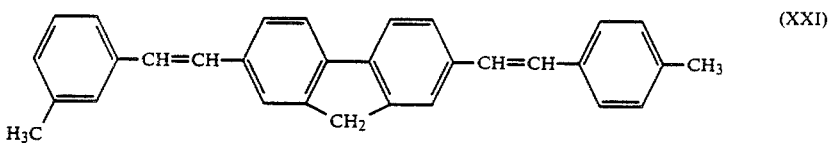

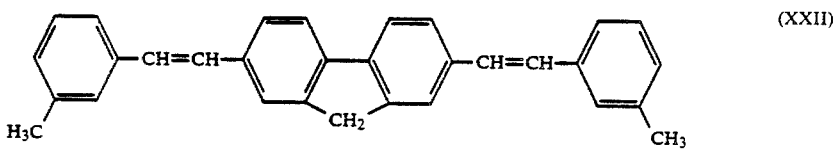

9. An electroluminescent element as claimed in claim 1, wherein the bisstyryl derivative is a compound represented by the structural formula (XXIII) below,

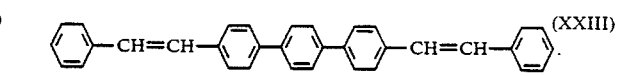

10. An electroluminescent element as claimed in claim 1, wherein said hole transport layer is made of a triphenylamine derivative represented by the structural formula below,

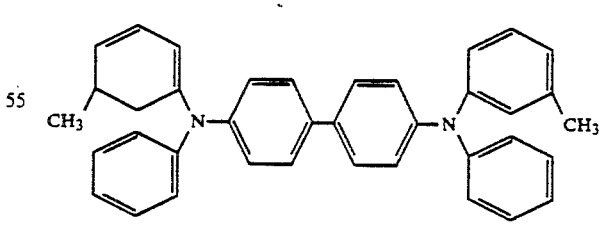

* * * * *